United States Patent [19]

Grall et al.

[11] Patent Number: 4,510,586
[45] Date of Patent: Apr. 9, 1985

[54] ARRAY SYSTEM WITH HIGH RESOLVING POWER

[75] Inventors: Georges Grall; Jacques Joseph; Claude Lemoine, all of Paris, France

[73] Assignee: Thomson-CSF, Paris, France

[21] Appl. No.: 425,703

[22] Filed: Sep. 28, 1982

[30] Foreign Application Priority Data

Jan. 8, 1982 [FR] France .................. 82 00236

[51] Int. Cl.³ ............................................. G01S 15/02
[52] U.S. Cl. ....................... 367/87; 367/105; 367/154; 367/905; H04R/1/32
[58] Field of Search .................. 367/87, 99, 105, 905, 367/154; 343/379

[56] References Cited

U.S. PATENT DOCUMENTS 4,234,939 11/1980 Grall ............................... 367/905 X Primary Examiner—Richard A. Farley
Attorney, Agent, or Firm—Oblon, Fisher, Spivak, McClelland & Maier

[57] ABSTRACT

An array with high resolving power and low secondary lobe levels, comprising a receiving array formed of transducers along its length $L_R$, two of these transducers, separated by a distance $L_E$, also forming the transmitters. The change from transmission to reception and back is effectuated by switches. Signals received by transducers are weighted by resistors before being delivered to beam forming circuits, containing multi-terminal phase shifters and a wiring matrix and adders. The weighting function and ratio $L_E/L_R$ are chosen to ensure that the overall transmission-reception system diagram has high resolving power and low secondary lobe levels.

6 Claims, 8 Drawing Figures

FIG. 5
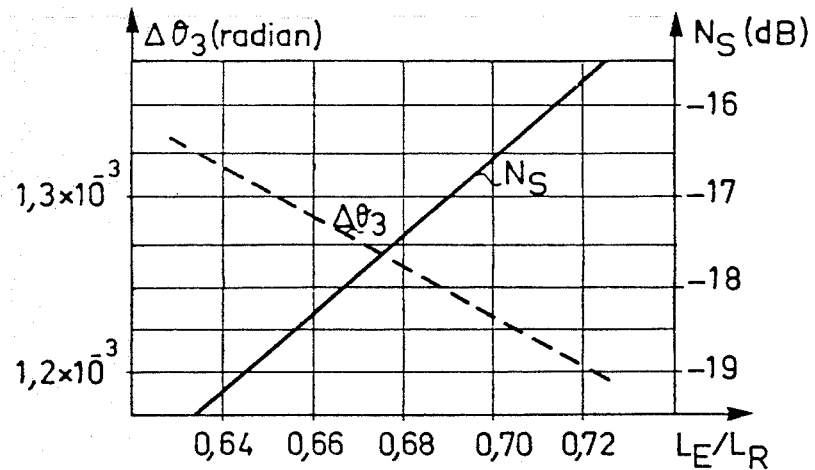
FIG. 7
$f(x) = 0.825 + 0.175 \cos^4(\pi x)$
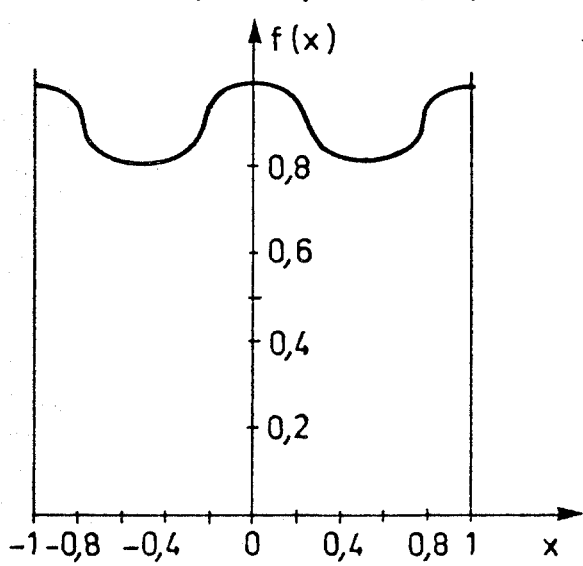
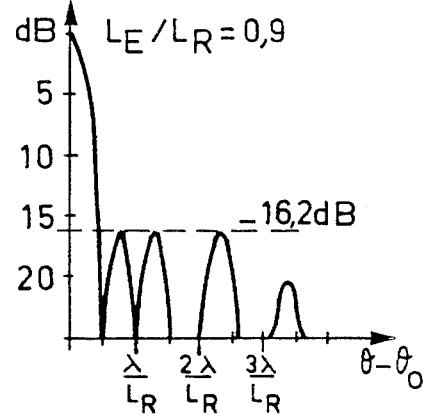
FIG. 8

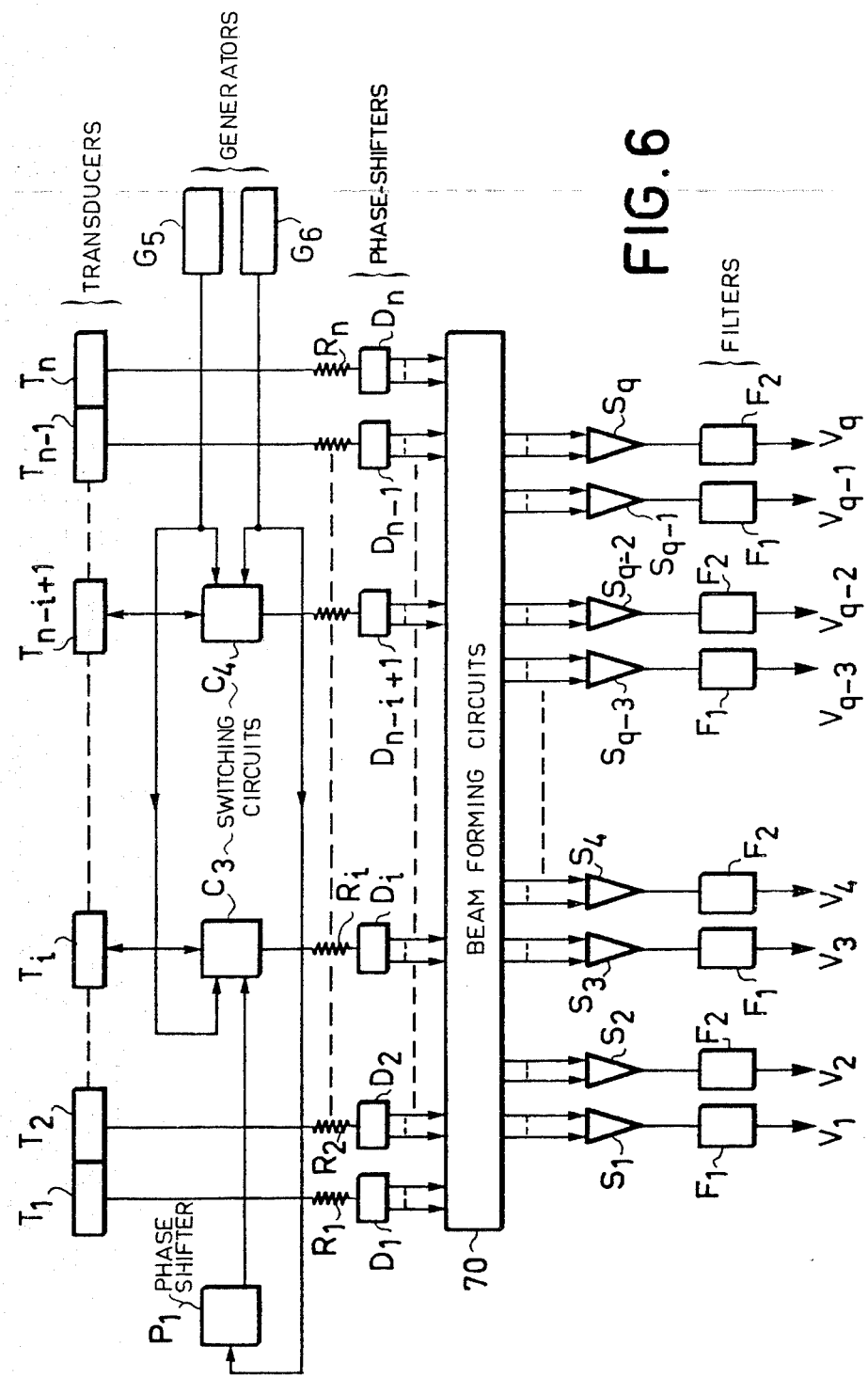

ARRAY SYSTEM WITH HIGH RESOLVING POWER

BACKGROUND OF THE INVENTION

1. Field of the Invention

This invention concerns a system of arrays or antennas with high resolving power.

More specifically, the invention concerns detection of targets by a wave detection system, such as a sonar system, in which waves are transmitted and received after being reflected on a target or targets, by means of nonidentical transmitting and receiving arrays.

The main requirement in such systems is to obtain the highest possible angular resolving power, namely the ability of the array system to distinguish between two targets very close together given the size of the transmitting and receiving arrays.

2. Description of the Prior Art

Attempts have been made to obtain high resolving power in array systems in the prior art.

For example, more or less omnidirectional emitting arrays has been combined with a receiving array formed of transducers placed side by side along a line. This is known as a "full" receiving array.

Another method is to combine a full transmitting array with a full receiving array, in which case the reversibility of transducers makes it possible for a single array to act in turn as transmitting and receiving array.

A system comprising full transmitting and receiving array has a known resolving power provided the transducer amplitude and phase are constant. The same is true if the amplitude is constant and if the phase increases by a constant amount from one transducer to the next.

It is known to obtain a high resolving power, by using a transmitting array with uniformly distributed transducers, and a receiving array with only two end transducers. Both arrays are approximately the same length. By adding the signals delivered by these end transducers, it becomes possible to obtain a cosinusoidal radiation diagram, which acts as a multiplying factor for the radiation diagram of the full transmitting array.

It is also known to preform an angular beam for a full array, by applying signals detected by transducers to multiple-terminal phase-shifters. The various channels are obtained by adding dephased signals together.

It is known to use a system comprising transmitting and receiving arrays of the same length, the receiving array being full and the transmitting array being formed of two transducers at its ends. Signals detected by the receiving array are delivered to beam-forming circuits. In this device, transmitting is performed at two frequencies. The two transmitting transducers are in phase for the first frequency, while for the second they are in opposite phases. Half the preformed beams correspond to one of the frequencies, and the other half to the other frequency.

The angular width at 3 dB of the main lobe of the transmission-reception diagram is half that obtained with the same receiving array when there is only one transmitting transducer.

The drawback of this system is that secondary transmission-reception diagram lobes are high, particularly the first, which reaches a maximum level at 13 dB. Such a level of secondary lobes seriously affects the signal/noise ratio, particularly for underwater acoustics.

This invention overcomes such difficulties by reducing the distance between the two transmitting transducers and weighting received signals, thereby providing high angular resolution and low secondary lobe levels.

SUMMARY OF THE INVENTION

The invention concerns an array system to detect waves, such as sonar waves with high resolving power, comprising an transmitting array and a receiving array, the lengths of these two arrays being $L_E$ and $L_R$ respectively, the receiving array being formed of transducers placed along its length $L_R$, and the transmitting array being formed of two transducers, receiving array transducers being connected to multiple-terminal phase-shifters and co-operating with an adding device to preform detection channels covering emission lobes one by one, so that the transmission-reception system has an overall diagram with greater resolving power for each preformed beam, this array system being characterized by the fact that the length $L_E$ of the transmitting array is shorter then the length $L_R$ of the receiving array, that receiving array transducers are connected to the multiple-terminal phase shifters by means of a device for weighting the amplitude of signals received by these transducers, and that the weighting function is calculated, as well as the ratio of $L_E$ to $L_R$, to ensure that secondary lobe maxima on the transmission-reception diagram will be less than $-16$ dB, and that the angular width at 3 dB of the main lobe of this diagram will not be greater than $1.3\Delta\theta_1$, where $\Delta_1$ is the angular width without weighting for a ratio $L_E/L_R = 1$.

BRIEF DESCRIPTION OF THE DRAWINGS

Other advantages and features of the invention will emerge from the following description, with reference to the accompanying figures:

FIG. 5, showing a diagram to illustrate the variation in angular resolution and the level of the first secondary lobe, depending on the ratio of array lengths;

FIG. 6, showing a flowsheet of one embodiment of the invention;

FIGS. 7 and 8, showing a weighting function and the resulting transmission-reception diagram.

DESCRIPTION OF THE PREFERRED EMBODIMENTS

Figure 1:
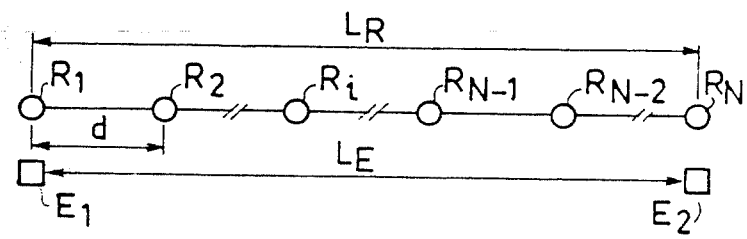
FIG. 1, showing an array system in the prior art.

FIG. 1 shows the arrangement of transmitting and receiving arrays in the prior art.

The transmitting array comprises two transmitting transducers ($E_1$ and $E_2$), and the receiving array N equidistant receiving transducers ($R_1$ to $R_N$), separated by a distance d. The two transmitters ($E_1$ and $E_2$) are separated by a distance $L_E$, and the length of the receiving array is $L_R = (N-1)d$, where $L_E = L_R = L$, L being the equal length of both arrays.

The two transmitters ($E_1$ and $E_2$), each transmit a signal simultaneously at a frequency f, and the space is insonified by interferences between the two signals, and a distant point located in the direction forming an angle $\theta$ to the perpendicular to the array receives the signal, the amplitude of which is given by the following equation, differing only by a multiplicatory constant:

$$E(\theta) = \cos(\pi L \sin \theta / \lambda) \quad (1)$$

where transmission from both transducers is assumed to be in phase, and $\lambda$ is the wevelength in the propagation medium.

If the transmission phases are in opposition, $E(\theta)$ is given by the equation:

$$E(\theta) = \sin(\pi L \sin \theta / \lambda) \quad (2)$$

In the prior art, receiving array signals are delivered without weighting the beam forming circuits, in directions identified by the angle $\theta_o$. The directivity diagram for the receiving array alone, assumed to be full over the whole length L, is $F(\theta)$, corresponding to an array system containing a single transmitting transducer. For a preformed beam in the direction corresponding to the angle $\theta_o$, $F(\theta)$ is given by the following equation:

$$F(\theta) = \frac{\sin(\pi L(\sin \theta - \sin \theta_o)/\lambda)}{L(\sin \theta - \sin \theta_o)/\lambda} \quad (3)$$

The overal directivity function $G(\theta)$ of the array system in FIG. 1 is given by the following equation:

$$G(\theta) = E(\theta) = F(\theta) \quad (4)$$

Preformed beam directions $\theta_o$ are such that they correspond to maximum points for the formula $E(\theta)$. Consequently, if both transmitting transducers ($E_1$ and $E_2$) are in phase, beam angles $\theta_o$ will be given, on the basis of equation (1) above, so that:

$$\pi L \sin \theta_o / \lambda = p\pi \quad (5)$$

where p is an integer.

On the basis of equations (3), (4), (5), the following value can be found for $G(\theta)$:

$$G(\theta) = \frac{\sin 2\pi L(\sin \theta - \sin \theta_o)/\lambda}{2\pi L(\sin \theta - \sin \theta_o)/\lambda} \quad (6)$$

The directivity function $G(\theta)$ given by equation (6) corresponds to a receiving array that is twice the length in the direction $\theta_o$ of that given by equation (3), assuming transmission with a single transducer.

Figure 2:
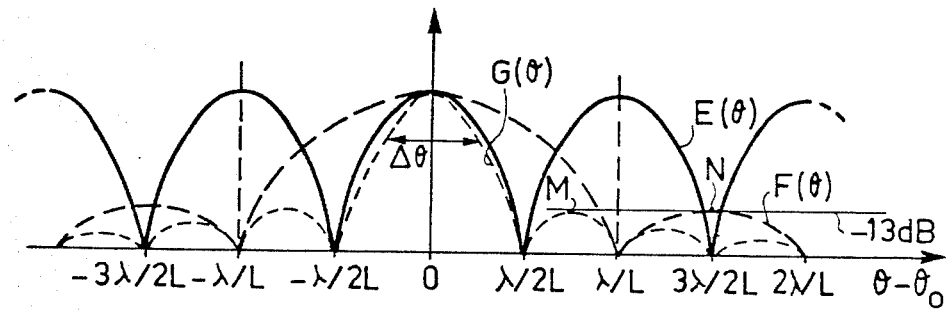
FIG. 2, showing transmission, reception and transmission-reception diagrams of the prior art.

FIG. 2 shows the absolute values of functions $E(\theta)$, $F(\theta)$ and $G(\theta)$, according to equations (1), (3) and (4) in relation to $\theta - \theta_o$. The angular width at 3 dB $\Delta\theta$ of the function $G(\theta)$ (in a dotted line) may be seen to be half this width for the function $F(\theta)$ (in a broken line). The function $F(\theta)$ (in a continous line), has its maximum points at $\theta - \theta_o = p\pi/L$. For purposes of simplification, $\sin \theta_o$ and $\theta$ have been taken as equal to $\theta_o$ and $\theta$.

The first secondary maxima N and M of functions $F(\theta)$ and $G(\theta)$, both at $-13$ dB, are also shown.

FIG. 2 shows these functions in absolute value in relation to the angle $\theta - \theta_o$.

Reception beams are formed in directions corresponding to transmission maxima, so that coverage is not complete, since there is a poorly insonified zone between these beams. To overcome this, two simultaneous transmissions are made separable from the previous ones, for example at different frequencies, but dephased by $\pi$, so as to obtain maxima in place of previous zeros; channels are then formed in the directions of these new maxima. Transmitter functions in the case of phase-shifting by are given by equation (2), with replaced by the value of the wavelength corresponding to the second frequency.

A level of secondary lobes at $-13$ dB, as in the prior art, can often cause problems, for underwater acoustics.

For a receiving array with a single transmitter, the level of secondary lobes can be reduced by weighting the amplitude of signals received. The weighting function f(x) in relation to the transducer co-ordinate x is often a Tschebycheff function.

In this invention, secondary lobes of array systems comprising two transmitters and one full receiving array are reduced by optimalizing both the ratio of the length $L_E$ of the transmitting array to the length $L_R$ of the receiving array, and the weighting function f(x).

Figure 3:
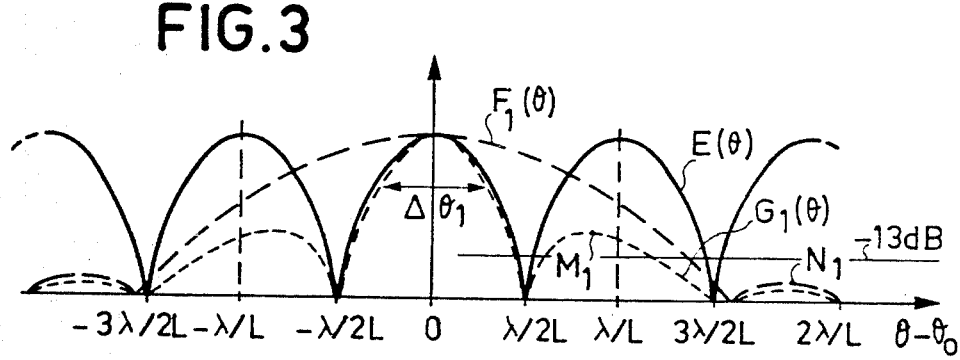
FIG. 3, showing transmission, reception and transmission-reception diagrams with weighting for equal array lengths.

Weighting used for an array system with a single transmitter is unsuitable for a system involving interferometric transmission, as shown in FIG. 3.

FIG. 3 shows the transmission directivity function $E(\theta)$, as a continuous line, the balanced receiving directivity function $F_1(\theta)$, as a broken line, and the overall directivity function $G_1(\theta)$, as a dotted line, in terms of $\theta - \theta_o$. In this example, the function $F_1(\theta)$ obtained by weighting is such that the level of secondary lobes is less than for an unweighted array. The maximum $N_1$ is lower than the maximum N in FIG. 2.

FIG. 3 shows that the angular width $\Delta\theta_1$ of the main lobe of the overall directivity function $G_1(\theta)$ at 3 dB is approximately equal to the value $\Delta\theta$ for an unweighted array. In contrast, the maximum $M_1$ of the first secondary lobe of $G_1(\theta)$ is greater than the maximum M for an unweighted array.

The reason for this phenomenon is that the main lobe of the directivity function of the weighted receiving array $F_1(\theta)$ has widened, while the transmission directivity function $E(\theta)$ remains unchanged. The result is that the level of the first secondary lobe of $G_1(\theta)$ is the product of the main lobe of $F(\theta)$ by the first lateral arch of $E(\theta)$. In contrast, the main lobe of $G_1(\theta)$ is not widened, since its width is governed by $E(\theta)$. In contrast, the main lobe of $G_1(\theta)$ is not widened, since its width is governed by $E(\theta)$.

The example of a receiving array with a length $L_R = 500$ will be considered.

If $L_E = L_R$, and if signals are not weighted, according to equation (4) and FIG. 2, the width $\Delta\theta$ of the main lobe of $G(\theta)$ is equal to $0.88 \times 10^{-3}$ radians, and the level of the first secondary lobe is $-13$ dB. If $L_E$ still is equal to $L_R$ and a Tschebycheff weighting function is adopted, so that the maximum $N_1$ of the first secondary lobe of $F_1(\theta)$ in FIG. 3 is $-30$ dB, the maximum $M_1$ of the first secondary lobe of $G_1(\theta)$ is found to be $-9$ dB. This proves that such weighting in fact detracts from contrast.

Figure 4:
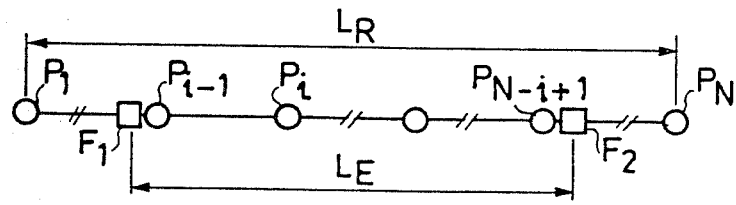
FIG. 4, showing an array system embodying this invention.

The array system proposed in this invention is represented in FIG. 4. The length $L_E$ of the transmitting array is shorter that the length $L_R$ of the receiving array. This reduction in the length of the transmitting array results in a widening of each lobe of the transmitting directivity $E_2(\theta)$, and consequently in the main lobe of the resultant directivity $G_2(\theta)$.

In this invention, the ratio $L_E/L_R$ is chosen in combination with the choice of the weighting function of the receiving array so that the level of secondary lobes and width of the main lobe will be kept within given bounds.

FIG. 5 shows variations in the angular width $\Delta\theta_3$ of the main lobe at 3 dB, and in the level of the first secondary lobe $N_S$ in relation to $L_E/L_R$. Weighting is the same as above. This shows that when the ratio $L_E/L_R$ falls, the level of the first secondary lobe $N_S$ (a continuous line) decreases, while the width $\Delta\theta_3$ of the main lobe at 3 dB fading increases. If $L_E/L_R=0.67$, than $N_S=-18$ dB and $\Delta\theta_3=1.3\times10^{-3}$ radians.

FIG. 6 shows an embodiment of the invention. The transmission reception array system is formed of n transducers ($T_1$ to $T_n$). Two of these transducers ($T_i$ and $T_{n-i+1}$) are used for transmitting. They are selected so that the distance between them is in a given ratio to the distance between the two end transducers $T_1$ and $T_n$. The amplitude of signals received by the transducers is weighted by means of electric resistors ($R_1$ to $R_n$), the values of which are adjusted to suit the weighting function adopted.

The change from transmitting to receiving and back for transducers $T_i$ and $T_{n-i+1}$ is effected by switches ($C_3$ and $C_4$). Transmission takes place simultaneously at two frequencies $f_1$ and $f_2$, signals being supplied by two generators ($G_5$ and $G_6$). The first generator ($G_5$) is connected directly to the switches ($C_3$ and $C_4$), while the other ($G_6$) is connected directly to $C_4$, and to $C_3$ through a $\pi$ phase shifter ($P_1$). Next, q angular beams are formed, to cover the necessary angular sector adequately. To this effect, the n signals received and balanced are dephased in phase shifters ($D_1$ to $D_n$), then added approximately in adders ($S_1$ to $S_q$), by means of a wiring matrix (70). Half of them, from receiving beams centred on $f_1$ transmission maxima are filtered around $f_1$ by filters ($F_1$), while the other half, centred on $f_2$ transmission maxima, are filtered around $f_2$ by other filters ($F_2$). The filters deliver q signals on channels $V_1$ to $V_q$.

Another embodiment of the invention introduces weighting functions f(x) other than Tschebycheff functions. For example, f(x) may be chosen so that:

$$f(x)=0.825+0.175\cos^4(x\pi) \tag{7}$$

as shown in FIG. 7, and the ratio $L_E/L_R$ is 0.9.

FIG. 8 shows the overall directivity function for $(\theta-\theta_0)$ above zero with such a weighting function obtained by multiplying the transformed Fourier function of f(x) by the function $E(\theta)$. This shows that the angular width of the main lobe at 3 dB for this overall directivity function is approximately $10^{-3}$ radians, if $L_E=500\lambda$, and secondary maxima do not exceed $-16.2$ dB.

This invention thus proposes an array system combining good angular resolution with low secondary lobe levels.

What is claimed is:

1. An array system for detecting waves, such as sonar waves, with high resolving power, comprising:
    a transmitting array having a length $L_E$ and including two transducers;
    a receiving array having a length $L_R$ which is longer than $L_E$ and wherein said receiving array includes a plurality of transducers placed along said length $L_R$;
    a plurality of multiple-terminal phase shifters connected to said receiving transducers;
    adding means connected to said receiver transducers to perform wave-detection beams covering transmission lobes one by one whereby said array system has an overall diagram with increased resolving power for each preformed beam; and
    weighting means connected to said receiver transducers and to said phase shifters for weighting the amplitude of the input of said receiving transducers, for calculating a weighted function and for calculating the ratio of $L_E/L_R$ in order to ensure that the secondary lobe maxima on the transmission-reception diagram will be less than $-16$ dB and that the angular width at 3 dB of the main lobe of said diagram will not be greater than $1.3\Delta\theta_1$ is the angular width without weighting for a ratio $L_E/L_R$ equal to 1.

2. An array system as claimed in claim 1 wherein said weighting function used to weight said received signals is a Tschebycheff function.

3. An array system as claimed in claim 2 wherein said ratio $L_E/L_R$ is 0.67.

4. An array system as claimed in claim 1 wherein said weighting function f(x) is defined by $f(x)=0.825+0.175\cos^4(x)$, where x is the coordinate along the receiving array with the starting point being at the center of said array and wherein the ratio $L_E/L_R$ is 0.9.

5. An array system as claimed in claim 1 wherein said two transmitting transducers simultaneously transmit at two frequencies $f_1$ and $f_2$ and wherein both said two transmitters are in phase at frequency $f_1$ and are out of phase at frequency $f_2$ and wherein said preformed beams correspond to signals received at each of said frequencies $f_1$ and $f_2$ alternately.

6. An array system as claimed in claim 1 further comprising a plurality of switches for effecting the change from transmission to reception and wherein said two transmitting transducers also form part of said receiving array.

* * * * *